(12) United States Patent
Balasubramanian et al.

(10) Patent No.: US 9,674,761 B2
(45) Date of Patent: Jun. 6, 2017

(54) TECHNIQUES AND APPARATUSES FOR IMPROVED CELL TRANSFER DURING CALL SETUP PROCEDURE

(71) Applicant: QUALCOMM Incorporated, San Diego, CA (US)

(72) Inventors: Ravi Balasubramanian, La Jolla, CA (US); Sitaramanjaneyulu Kanamarlapudi, San Diego, CA (US); Chetan Chakravarthy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/057,503

(22) Filed: Mar. 1, 2016

(65) Prior Publication Data
US 2017/0127333 A1 May 4, 2017

Related U.S. Application Data

(60) Provisional application No. 62/247,985, filed on Oct. 29, 2015.

(51) Int. Cl.
| | | |
|---|---|---|
| *H04W 36/00* | (2009.01) | |
| *H04W 36/36* | (2009.01) | |
| *H04W 36/24* | (2009.01) | |
| *H04W 36/18* | (2009.01) | |
| *H04W 36/30* | (2009.01) | |

(52) U.S. Cl.
CPC .......... *H04W 36/36* (2013.01); *H04W 36/18* (2013.01); *H04W 36/24* (2013.01); *H04W 36/30* (2013.01)

(58) Field of Classification Search
CPC ..... H04W 36/36; H04W 36/24; H04W 36/18; H04W 36/30
USPC .............................. 455/437, 436, 442, 432.3
See application file for complete search history.

(56) References Cited

U.S. PATENT DOCUMENTS

| | | | |
|---|---|---|---|
| 8,565,187 B2 | 10/2013 | Lee | |
| 2011/0207458 A1* | 8/2011 | Tanaka | H04W 8/12 455/435.1 |

(Continued)

FOREIGN PATENT DOCUMENTS

| | | |
|---|---|---|
| EP | 2107732 A1 | 10/2009 |
| WO | WO-2011123527 A1 | 10/2011 |
| WO | WO-2014117390 A1 | 8/2014 |

OTHER PUBLICATIONS

ISA/EP, International Search Report and Written Opinion of the International Searching Authority, Int'l Application No. PCT/US2016/058044, Dec. 15, 2016, European Patent Office, Rijswijk, NL. 13 pgs.

*Primary Examiner* — Khai M Nguyen
(74) *Attorney, Agent, or Firm* — Ashish L. Patel

(57) ABSTRACT

Certain aspects of the present disclosure generally relate to wireless communications. In some aspects, a wireless communication device may determine, in a particular state, that a wireless communication device is performing a connection establishment procedure. The wireless communication device may refrain from transferring from a first radio access technology (RAT) to a second RAT until completing the connection establishment procedure. The second RAT may satisfy a set of transfer criteria associated with performing a transfer from the first RAT to the second RAT.

28 Claims, 12 Drawing Sheets

(56) References Cited

U.S. PATENT DOCUMENTS

| | | | |
|---|---|---|---|
| 2011/0274038 A1* | 11/2011 | Zhu | H04W 36/0022 370/328 |
| 2011/0312321 A1 | 12/2011 | Ramachandran et al. | |
| 2012/0044867 A1* | 2/2012 | Faccin | H04W 60/06 370/328 |
| 2012/0064884 A1 | 3/2012 | Ramachandran et al. | |
| 2012/0182912 A1* | 7/2012 | Watfa | H04W 36/0022 370/311 |
| 2012/0184276 A1* | 7/2012 | Pichna | H04W 36/0083 455/436 |
| 2013/0053034 A1* | 2/2013 | Lee | H04W 4/02 455/436 |
| 2014/0146784 A1* | 5/2014 | Swaminathan | H04W 48/18 370/331 |
| 2014/0247730 A1* | 9/2014 | Thota | H04W 36/0022 370/252 |
| 2015/0003342 A1 | 1/2015 | Swaminathan et al. | |

* cited by examiner

TECHNIQUES AND APPARATUSES FOR IMPROVED CELL TRANSFER DURING CALL SETUP PROCEDURE

CROSS-REFERENCE TO RELATED APPLICATION UNDER 35 U.S.C. §119

This application claims priority to U.S. Provisional Patent Application No. 62/247,985, filed on Oct. 29, 2015 entitled TECHNIQUES AND APPARATUSES FOR IMPROVED CELL TRANSFER DURING CALL SETUP PROCEDURE," which is hereby incorporated by reference herein.

FIELD OF THE DISCLOSURE

Aspects of the present disclosure generally relate to wireless communications, and more particularly to techniques and apparatuses for improved cell transfer during call setup procedure, for example, techniques and apparatuses for refraining from transferring from a first radio access technology (RAT) to a second RAT until completing a connection establishment procedure.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple (OFDM) access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method for wireless communication may include determining, by a wireless communication device in a particular state, that the wireless communication device is performing a connection establishment procedure. The method may include refraining, by the wireless communication device, from transferring from a first radio access technology (RAT) to a second RAT until completing the connection establishment procedure. The second RAT may satisfy one or more of a set of transfer criteria associated with performing a transfer from the first RAT to the second RAT.

In some aspects, a wireless communication device may include one or more processors configured to determine, in a particular state, that the wireless communication device is performing a connection establishment procedure. The one or more processors may be configured to refrain from transferring from a first RAT to a second RAT until completing the connection establishment procedure. The second RAT may satisfy one or more of a set of transfer criteria associated with performing a transfer from the first RAT to the second RAT.

In some aspects, a non-transitory computer-readable medium may store one or more instructions for wireless communication. The one or more instructions may include one or more instructions that, when executed by one or more processors, cause the one or more processors to determine, in a particular state, that a wireless communication device is performing a connection establishment procedure. The one or more instructions may cause the one or more processors to refrain from transferring from a first RAT to a second RAT until completing the connection establishment procedure. The second RAT may satisfy one or more of a set of transfer criteria associated with performing a transfer from the first RAT to the second RAT.

In some aspects, an apparatus for wireless communication may include means for determining, in a particular state, that a wireless communication device is performing a connection establishment procedure. The apparatus may include means for refraining from transferring from a first RAT to a second RAT until completing the connection establishment procedure. The second RAT may satisfy one or more of a set of transfer criteria associated with performing a transfer from the first RAT to the second RAT.

Aspects generally include a method, wireless communication device, computer program product, non-transitory computer-readable medium (e.g., for storing), and user equipment (UE) as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks, such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above, as well as other wireless networks and/or RATs.

Figure 1:
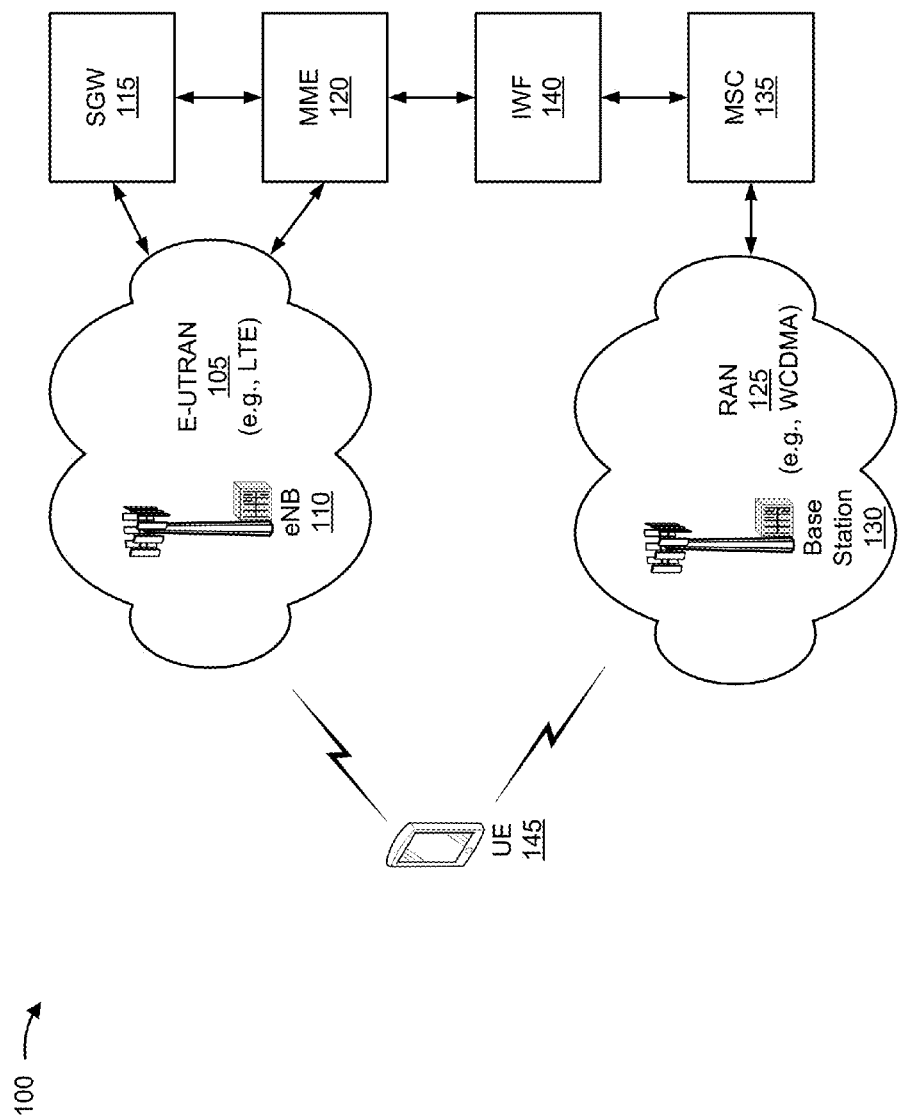
FIG. 1 is a diagram illustrating an example deployment in which multiple wireless networks have overlapping coverage, in accordance with various aspects of the present disclosure.

FIG. 1 is a diagram illustrating an example deployment 100 in which multiple wireless networks have overlapping coverage, in accordance with various aspects of the present disclosure. As shown, example deployment 100 may include a radio access network (RAN), such as an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a RAN 125, which may include one or more base stations 130, and which may communicate with other devices or networks via a mobile switching center (MSC) 135 and/or an inter-working function (IWF) 140. As further shown, example deployment 100 may include one or more user equipment (UEs) 145 capable of communicating via E-UTRAN 105 and/or RAN 125.

E-UTRAN 105 may support, for example, LTE or another type of RAT. E-UTRAN 105 may include eNBs 110 and other network entities that can support wireless communication for UEs 145. Each eNB 110 may provide communication coverage for a particular geographic area. The term "cell" may refer to a coverage area of eNB 110 and/or an eNB subsystem serving the coverage area.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, WCDMA or another type of RAT (e.g., a GSM RAT, a 1×RTT RAT, a data optimized (DO) RAT, and/or the like). RAN 125 may include base stations 130 and other network entities that can support wireless communication for UEs 145. MSC 135 may communicate with RAN 125 and may perform various functions, such as voice services, routing for circuit-switched (CS) calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a same RAT). In some aspects, E-UTRAN 105 and RAN 125 may use the same frequency and/or the same RAT to communicate with UE 145. In some aspects, E-UTRAN 105 and RAN 125 may use different frequencies and/or RATs to communicate with UEs 145.

In general, any number of wireless networks may be deployed in a given geographic area. Each wireless network may support a particular RAT and may operate on one or more frequencies. A RAT may also be referred to as a radio technology, an air interface, and/or the like. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, and/or the like. UE 145 may be a cellular phone, a personal digital assistant (PDA), a wireless modem, a wireless communication device, a handheld device, a laptop computer, a cordless phone, a wireless local loop (WLL) station, and/or the like.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, as needed. UE 145 may then operate in a connected mode to actively communicate with the serving network. Alternatively, UE 145 may operate in an idle mode and camp on the serving network if active communication is not required by UE 145.

UE 145 may be located within the coverage of cells of multiple frequencies and/or multiple RATs while in the idle mode. For LTE, UE 145 may select a frequency and a RAT to camp on based on a priority list. This priority list may include a set of frequencies, a RAT associated with each frequency, and/or a priority of each frequency (e.g., an absolute priority). For example, the priority list may include three frequencies X, Y and Z. Frequency X may be used for LTE and may have the highest priority, frequency Y may be used for WCDMA, GSM, and/or the like and may have the lowest priority, and frequency Z may also be used for WCDMA, GSM, and/or the like and may have medium priority. In general, the priority list may include any number of frequencies for any set of RATs and may be specific for the UE location. UE 145 may be configured to prefer LTE, when available, by defining the priority list with LTE frequencies at the highest priority and with frequencies for other RATs at lower priorities (e.g., as given by the example above).

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

UE 145 may be able to receive packet-switched (PS) data services from E-UTRAN 105 and may camp on the LTE network while in the idle mode. While UE 145 is in an LTE mode, on a mobile originated (MO) voice call request, UE 145 may be transferred to another wireless network (e.g., RAN 125) of another RAT for voice calls. This transfer may be referred to as circuit-switched (CS) fallback (CSFB). For example, UE 145 may be transferred from an LTE RAT to a WCDMA RAT to place a voice call in the CS domain (e.g., a CSFB call). UE 145 may be transferred to another RAT, such as 1×RTT, WCDMA, GSM, and/or the like. UE 145 may perform a connection establishment procedure to transfer to the other RAT.

The connection establishment procedure may include one or more signaling procedures, such as a location area (LA) update (LAU) procedure, a routing area (RA) update (RAU) procedure, a combined LA/RA update procedure, and/or the like. A threshold period of time after camping onto RAN 125 to establish a connection for the CSFB call, UE 145 may be permitted to transfer to E-UTRAN 105, thereby interrupting the connection establishment procedure and preventing a CSFB call. For example, in accordance with various aspects of the present disclosure, when UE 145 is in a cell forward access channel (CELL_FACH) state and when UE 145 determines that one or more of transfer criteria (e.g., further enhanced FACH (FE_FACH) transfer criteria) is/are satisfied, UE 145 may determine that UE 145 is permitted to transfer (e.g., reselect) to E-UTRAN 105. UE 145 may, in the CELL_FACH state, refrain from transferring to E-UTRAN 105 (e.g., an LTE RAT) until the connection establishment procedure is completed, despite the threshold period of time elapsing and one or more of the set of transfer criteria being satisfied.

In this way, UE 145 avoids interrupting the connection establishment procedure, thereby improving a likelihood that UE 145 successfully completes the CSFB call relative to interrupting the connection establishment procedure to reselect to E-UTRAN 105. Moreover, UE 145 may improve one or more key performance indicators (KPIs) based on improving a likelihood of completing the CSFB call, such as a call success rate related KPI and/or the like.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
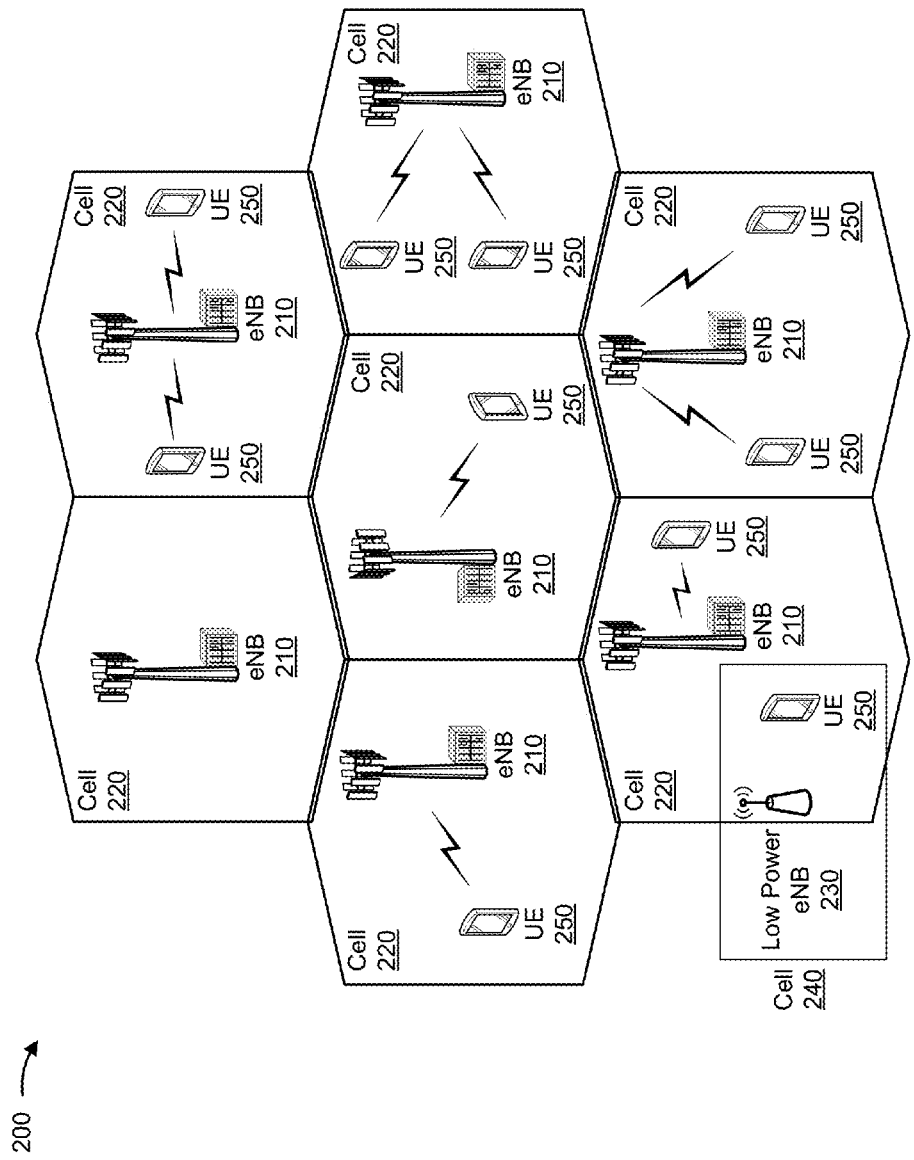
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). UE 145, 250 may correspond to UE 145 shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The low power eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

UE 145, 250 may perform a connection establishment procedure to fallback to RAN 125 for a CSFB call. For example, UE 145, 250 may connect to E-UTRAN 105 via a first eNB 110, 210 and may initiate a transfer to a second eNB 130, 210 to connect to RAN 125 (e.g., a WCDMA RAN). In this case, UE 145, 250 may refrain from or avoid (e.g., temporarily) transferring back to E-UTRAN 105 until the connection establishment procedure is completed, despite E-UTRAN 105 satisfying one or more of a set of transfer criteria (e.g., one or more of a set of FE_FACH reselection criteria), a timer associated with reselecting to E-UTRAN 105 expiring, and/or the like. In this way, UE 145, 250 is more likely to complete the CSFB call via the second eNB 130, 210 relative to permitting a transfer to the first eNB 110, 210 (e.g., to E-UTRAN 105).

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA), GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 210 may have multiple antennas supporting MIMO technology. The use of MIMO technology enables eNBs 210 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 210 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The number and arrangement of devices and cells shown in FIG. 2 are provided as examples. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
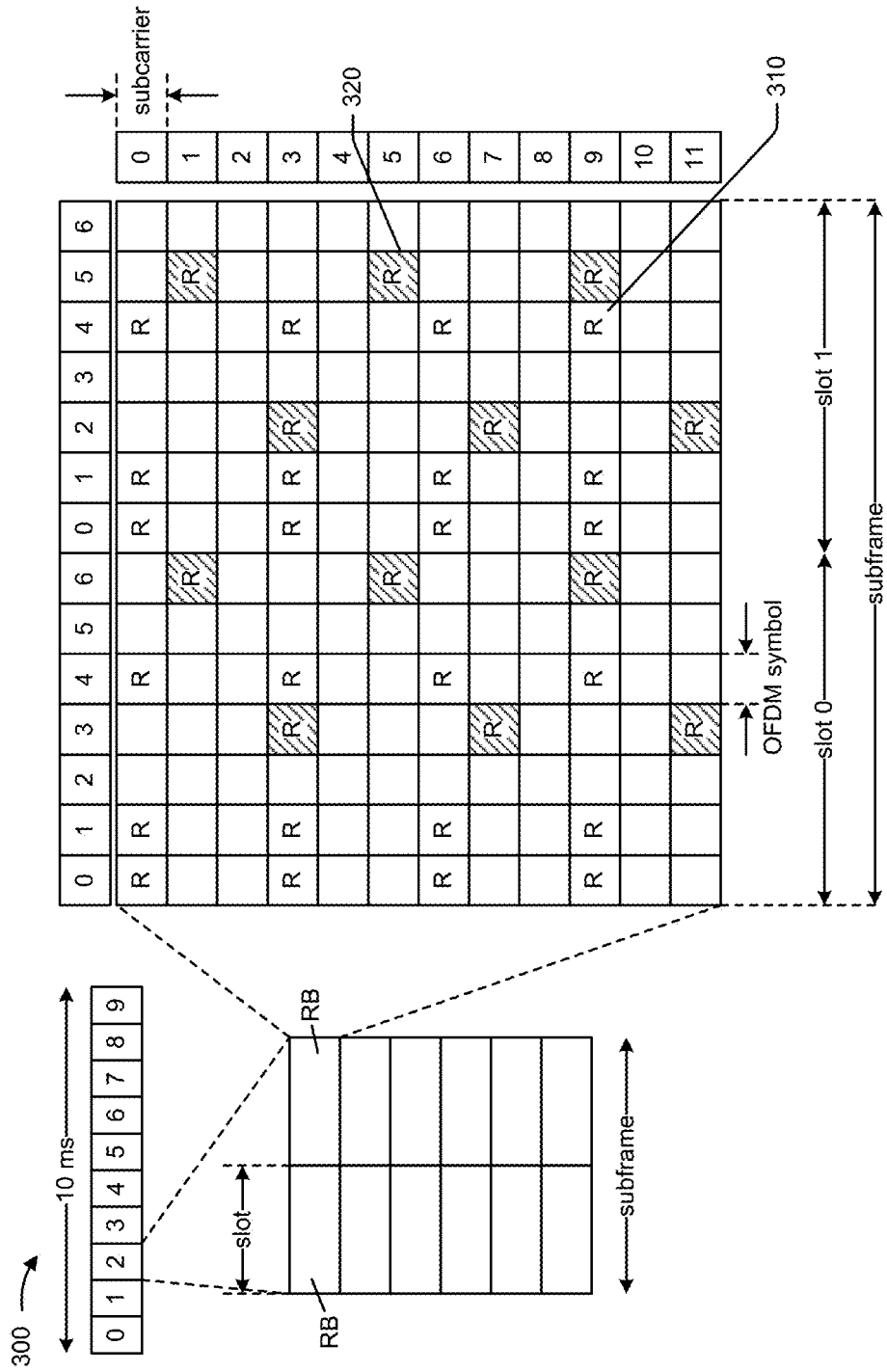
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

UE 145, 250 may receive information via a DL frame, as described herein. For example, prior to initiating fallback to a WCDMA RAT, UE 145, 250 may perform one or more portions of a connection establishment procedure based on receiving information via one or more DL frames. In some aspects, UE 145, 250 may perform one or more portions of the connection establishment procedure based on receiving information via one or more DL frames associated with a DL frame structure of WCDMA, GSM, 1×RTT, and/or the like. For example, UE 145, 250 may receive a request for a measurement report via the DL frame associated with the DL frame structure of WCDMA, GSM, 1×RTT, and/or the like.

As indicated above, FIG. 3 is provided as an example. Other examples are possible and may differ from what was described above in connection with FIG. 3.

Figure 4:
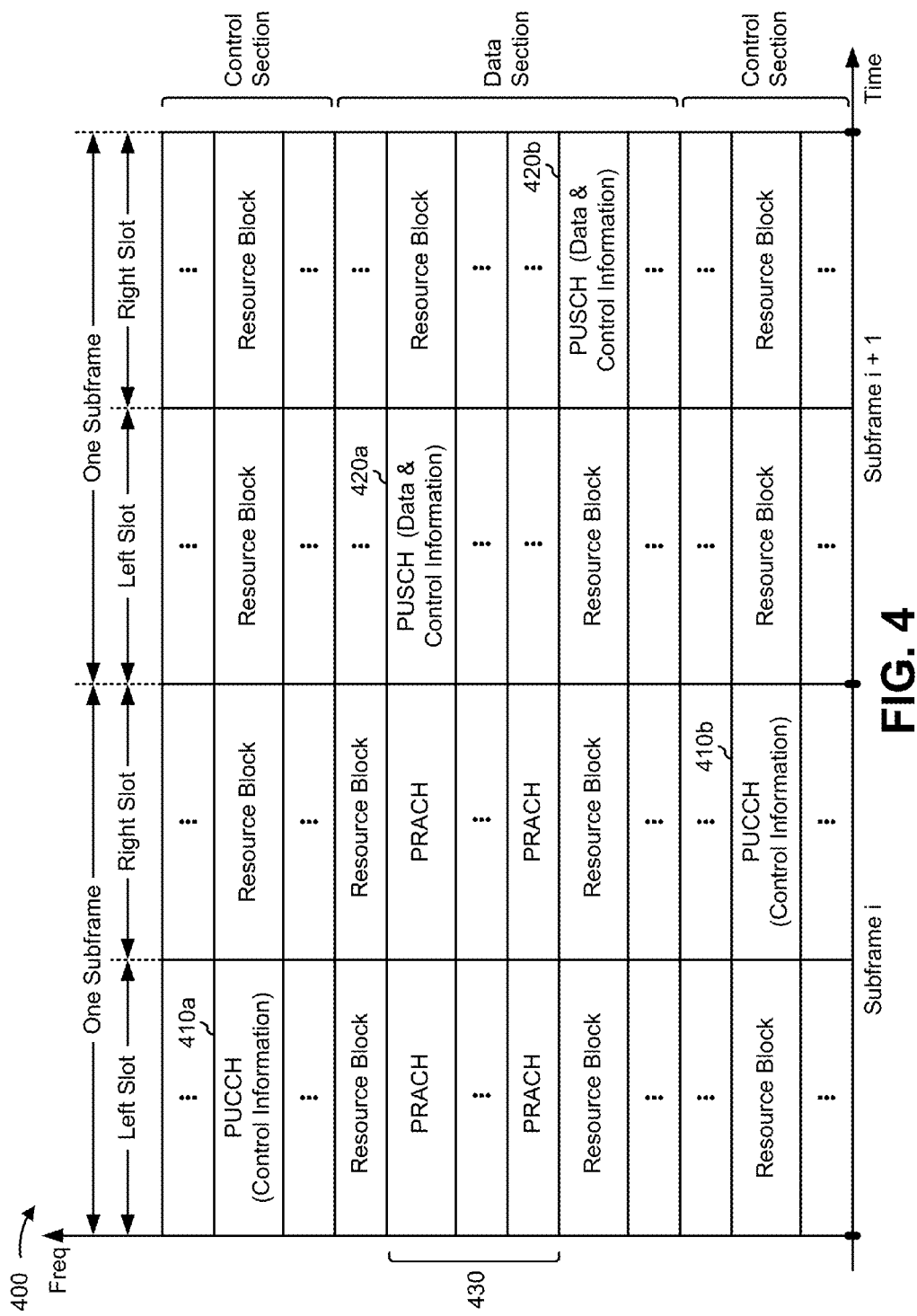
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data, or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

UE 145, 250 may transmit one or more signals via a UL frame, as described herein. For example, UE 145, 250 may initiate fallback to a WCDMA, GSM, 1×RTT, and/or the like RAT based on transmitting information via one or more UL frames. In some aspects, UE 145, 250 may transmit information to cause one or more portions of the connection establishment procedure via one or more UL frames associated with a UL frame structure of WCDMA, GSM, 1×RTT, and/or the like. For example, UE 145, 250 may transmit a measurement report via a UL frame associated with the UL frame structure of WCDMA, GSM, 1×RTT, and/or the like.

As indicated above, FIG. 4 is provided as an example. Other examples are possible and may differ from what was described above in connection with FIG. 4.

Figure 5:
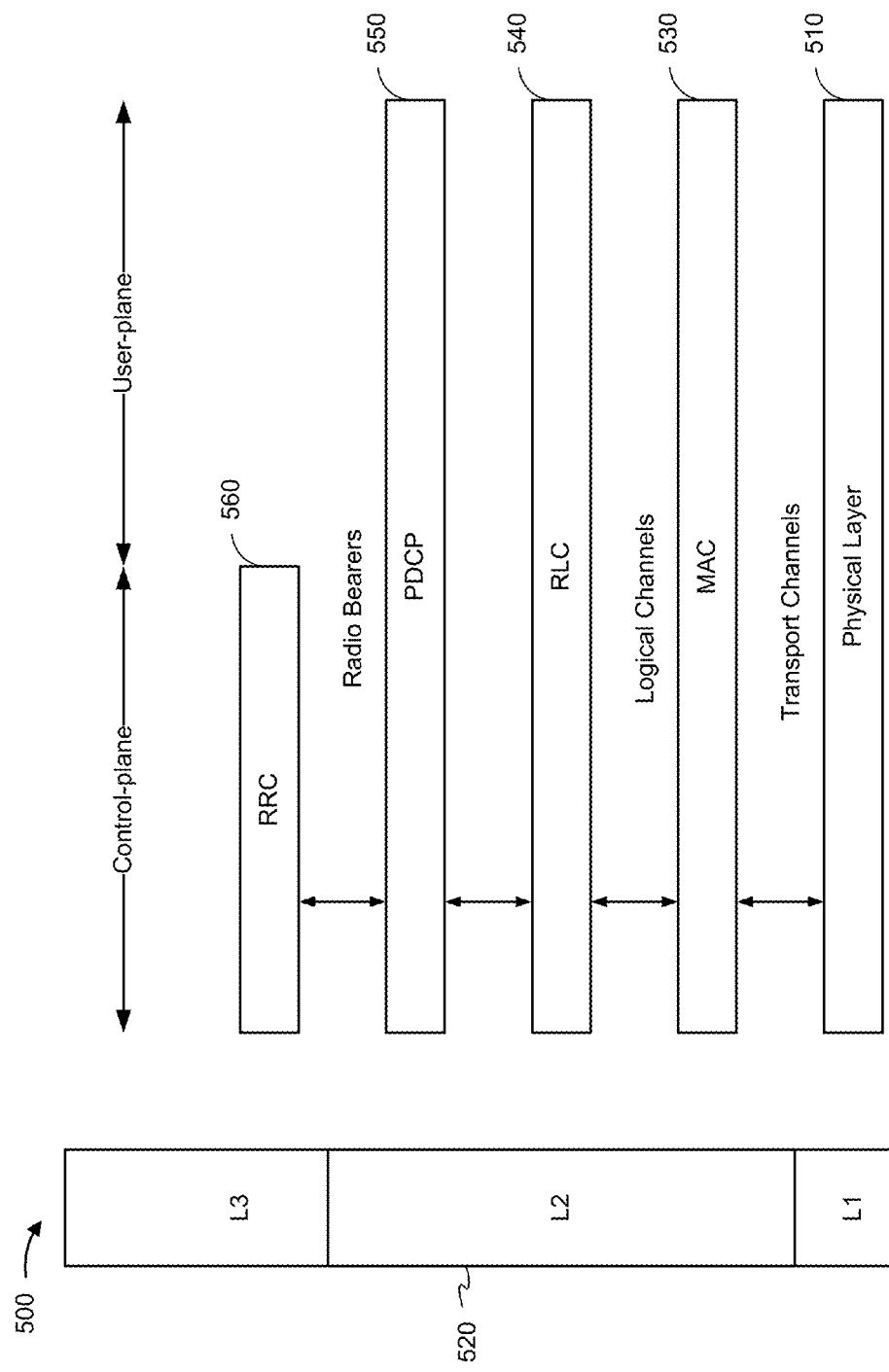
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes a media access control (MAC) sublayer 530, a radio link control (RLC) sublayer 540, and a packet data convergence protocol (PDCP) 550 sublayer, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., far end UE, server, and/or the like).

The PDCP sublayer 550 provides multiplexing between different radio bearers and logical channels. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB may be the same and/or substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (e.g., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
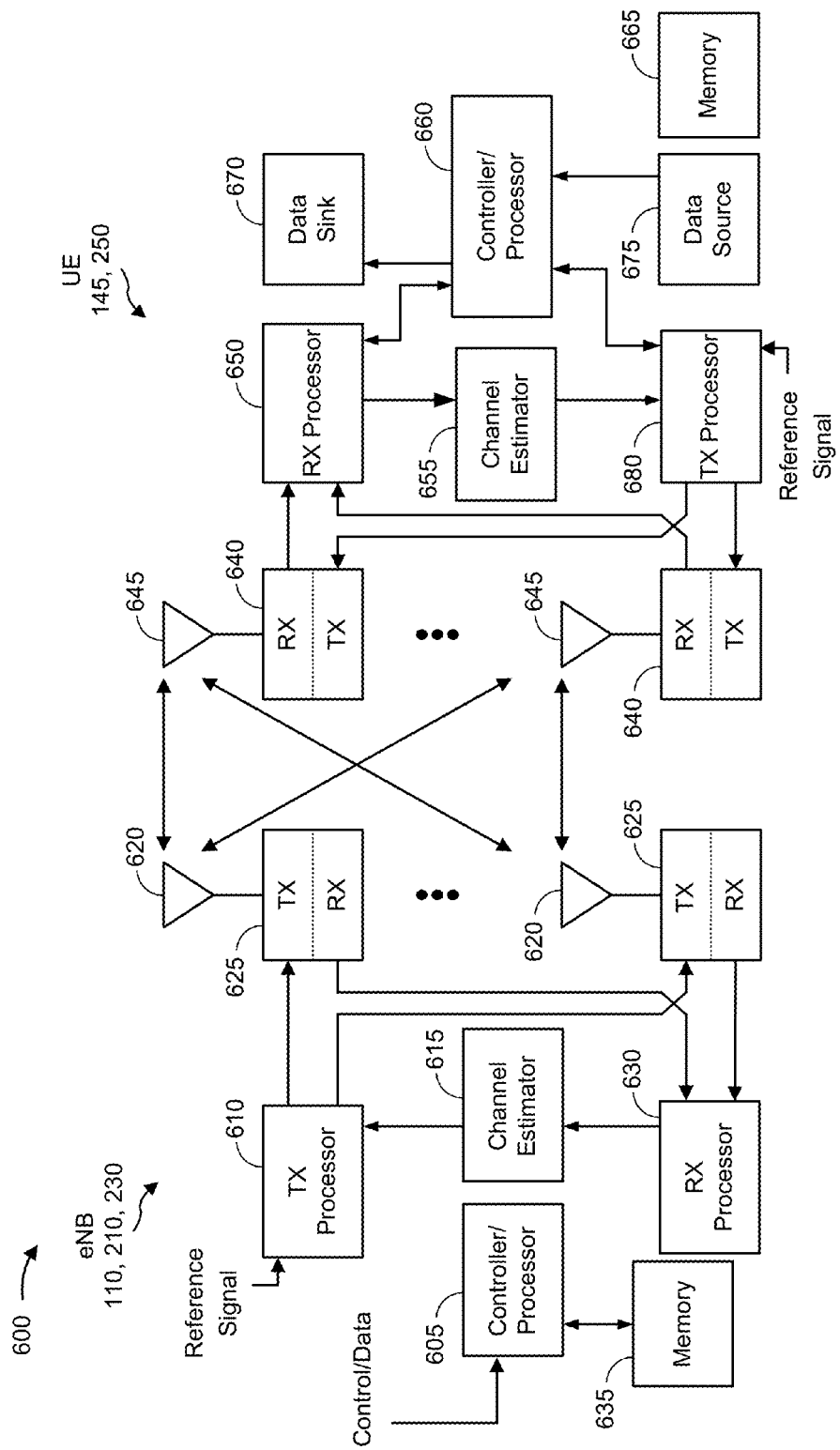
FIG. 6 is a diagram illustrating example components of an evolved Node B and a user equipment in an access network, in accordance with various aspects of the present disclosure.

FIG. 6 is a diagram illustrating example components 600 of eNB 110, 210, 230 and UE 145, 250 in an access network, in accordance with various aspects of the present disclosure. As shown in FIG. 6, eNB 110, 210, 230 may include a controller/processor 605, a TX processor 610, a channel estimator 615, an antenna 620, a transmitter 625TX, a receiver 625RX, a receiver (RX) processor 630, and a memory 635. As further shown in FIG. 6, UE 145, 250 may include a receiver RX 640RX, for example, of a transceiver TX/RX 640, a transmitter TX 640TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based at least in part on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based at least in part on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter 625TX, for example, of transceiver TX/RX 625. Each such transmitter TX modulates an RF carrier with a respective spatial stream for transmission.

At the UE 145, 250, each receiver RX 640RX, for example, of a transceiver TX/RX 640 receives a signal through its respective antenna 645. Each such receiver RX 640RX recovers information modulated onto an RF carrier and provides the information to the RX processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based at least in part on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using a positive acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based at least in part on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX 640TX, for example, of transceiver TX/RX 640 modulates an RF carrier with a respective spatial stream for transmission.

The UL transmission is processed at the eNB 110, 210, 230 in a manner similar to that described in connection with the receiver function at the UE 145, 250. Each receiver 625RX, for example, of transceiver TX/RX 625 receives a signal through its respective antenna 620. Each receiver 625RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the controller/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

One or more components of UE 145, 250 may be configured to perform cell transfer (e.g., reselection, handover, and/or the like), as described in more detail elsewhere herein. For example, the controller/processor 660 and/or other processors and modules of UE 145, 250 may perform or direct operations of, for example, process 900 of FIG. 9, process 1000 of FIG. 10, process 1100 of FIG. 11, process 1200 of FIG. 12, and/or other processes as described herein. In some aspects, one or more of the components shown in FIG. 6 may be employed to perform example process 900, process 1000, process 1100, process 1200, and/or other processes for the techniques described herein.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

As described in more detail below, UE 145, 250 may communicate with eNB 110, 210, 230. UE 145, 250 may be configured with a set of transfer criteria (e.g., a set of FE_FACH transfer criteria associated with reselection to an LTE RAN from a CELL_FACH state after initiating a CSFB call). Signaling for an LAU and/or RAU procedure and/or another portion of a connection establishment procedure may satisfy a threshold period of time, after which, UE 145, 250 may be permitted to transfer to the LTE RAN.

UE 145, 250 may refrain from transferring to the LTE RAN, despite satisfaction of one or more of the set of transfer criteria and/or satisfying the threshold period of time, as described in more detail below. In this way, UE 145, 250 improves a likelihood of CSFB call success relative to permitting the transfer to the LTE RAN. Moreover, improving the likelihood of CSFB call success may improve one or more KPIs, indicating an improvement to user experience, by increasing a likelihood of successfully establishing a call. Additionally or alternatively, UE 145, 250 may reduce a quantity of signaling messages being transmitted by the network by avoiding excess messages being transmitted as a result of UE 145, 250 repeatedly triggering a CSFB call and reselecting to the LTE RAN, thereby improving network performance for the LTE RAN, the CDMA RAN, and/or the like.

Figure 7:
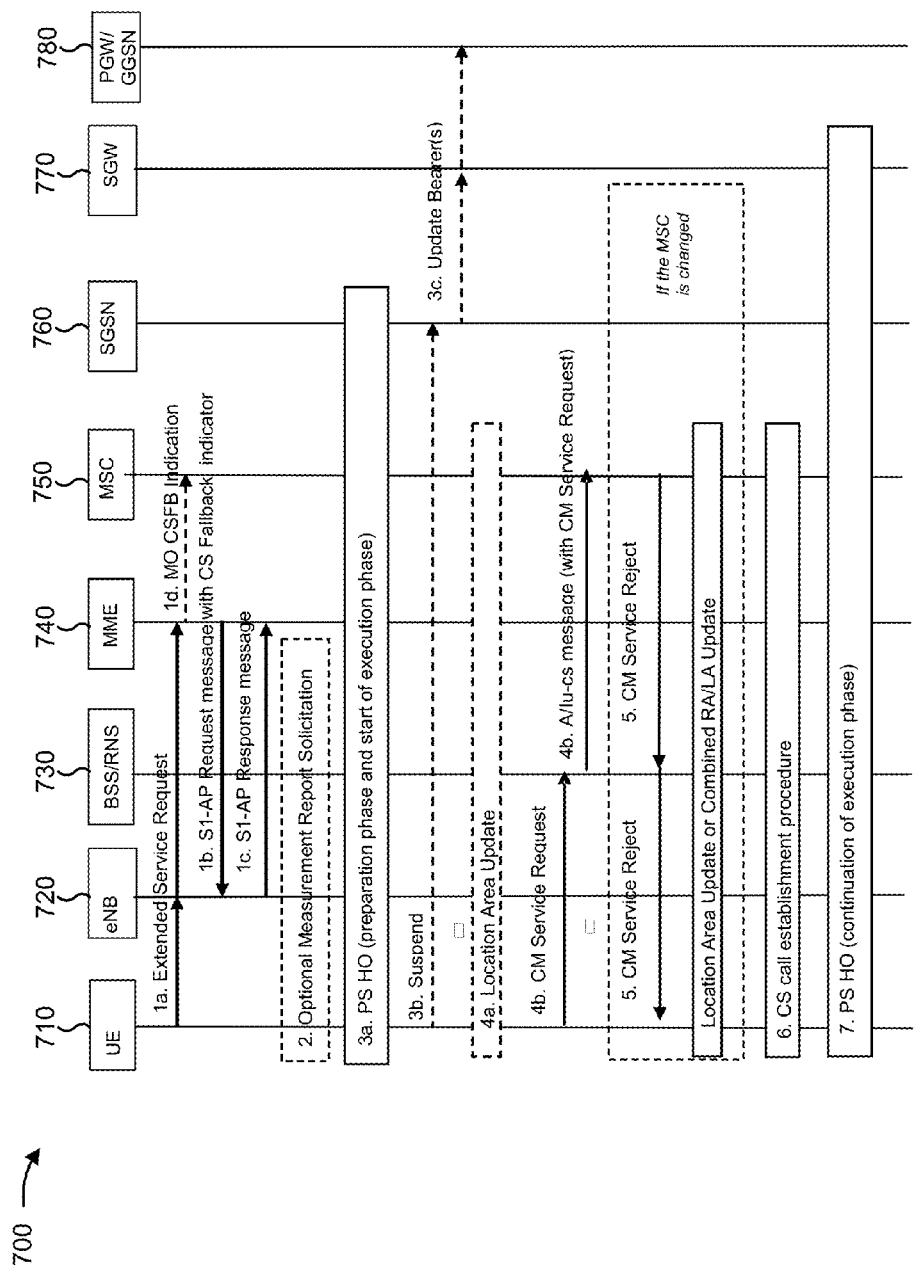
FIG. 7 is a diagram illustrating a call flow for a circuit switched fallback scenario, in accordance with various aspects of the present disclosure.

FIG. 7 is a diagram illustrating an example 700 where a wireless communication device (e.g., UE 145, 250) refrains from or avoids (e.g., temporarily) transferring to an LTE RAT, in accordance with various aspects of the present disclosure. For example, FIG. 7 illustrates a call flow for a connection establishment procedure when packet switched handover is supported, in accordance with various aspects of the present disclosure.

As shown in FIG. 7, an example implementation may include a UE 710, an eNB 720, a base station system/radio network system (BSS/RNS) 730, an MME 740, an MSC 750, a serving general packet radio service (GPRS) support node (SGSN) 760, an SGW 770, and a packet data network gateway/gateway GPRS support node (PGW/GGSN) 780.

UE 710 may correspond to UE 145 shown in FIG. 1, UE 250 shown in FIG. 2, and/or the like. eNB 720 may correspond to eNB 110 or base station 130 shown in FIG. 1, eNB 210 or low power eNB 230 shown in FIG. 2, and/or the like. MME 740 may correspond to MME 120 shown in FIG. 1 and/or the like. MSC 750 may correspond to MSC 135 shown in FIG. 1 and/or the like. SGW 770 may correspond to SGW 115 shown in FIG. 1 and/or the like.

As further shown in FIG. 7, and by reference indicator 1*a*, UE 145, 250, 710 may transmit an extended service request to MME 120, 740. The extended service request may be associated with triggering a mobile originating (MO) CSFB from an LTE RAT to a WCDMA RAT. UE 145, 250, 710 may transmit the extended service request based on being attached to the PS domain and having to initiate a voice call (e.g., via the LTE RAT). In some aspects, UE 145, 250, 710 may set a timer associated with determining whether a threshold time associated with the connection establishment procedure has elapsed, thereby permitting reselection to the LTE RAT (e.g., which UE 145, 250, 710 may disregard to continue the connection establishment procedure). For example, when UE 145, 250, 710 camps on the WCDMA RAT, UE 145, 250, 710 may trigger the timer.

As further shown in FIG. 7, and by reference indicator 1*b*, MME 120, 740 may transmit, to eNB 110, 130, 210, 230, 720, a UE context modification request to indicate that the CSFB is triggered. The UE context modification request may indicate that UE 145, 250, 710 is to be transferred to, for example, a UTRAN or GERAN RAT (e.g., to a CDMA RAT).

As further shown in FIG. 7, and by reference indicator 1*c*, eNB 110, 130, 210, 230, 720 may transmit, to MME 120, 740, a response message based on receiving the UE context modification request.

As further shown in FIG. 7, and by reference indicator 1*d*, MME 120, 740 may transmit, to MSC 135, 750, an MO CSFB indicator to identify the CSFB as being based on a CS MO call.

As further shown in FIG. 7, and by reference indicator 2, UE 145, 250, 710 may receive, from eNB 110, 130, 210, 230, 720, a request for a measurement report and/or provide a measurement report as a response to the request. The measurement report may provide information associated with identifying a target GERAN/UTRAN cell (e.g., a WCDMA cell) to which PS handover is to be performed for UE 145, 250, 710. A period of time associated with requesting and/or receiving the measurement report may exceed a threshold period of time associated with triggering a transfer to the LTE RAT. UE 145, 250, 710 may refrain or avoid (e.g., temporarily) from transferring to the LTE RAT despite the period of time exceeding the threshold period of time. In this way, UE 145, 250, 710 increases a likelihood of successfully completing the connection establishment procedure relative to permitting reselection to the LTE RAT.

As further shown in FIG. 7, and by reference indicator 3*a*, eNB 110, 130, 210, 230, 720 may trigger PS handover to a GERAN/UTRAN neighbor cell (e.g., by a transmitting a handover required message to MME 120, 740).

As further shown in FIG. 7, and by reference indicator 3*b*, UE 145, 250, 710 may transmit a suspend message to SGSN 760 to initiate a suspend procedure.

As further shown in FIG. 7, and by reference indicator 3*c*, based on receiving the suspend message, SGSN 760 may be caused to follow the suspend procedure by causing deactivation of bearers for UE 145, 250, 710 (e.g., in association with SGW 115, 770 and PGW/GGSN 780).

As further shown in FIG. 7, and by reference indicator 4*a*, UE 145, 250, 710 may initiate a location area update (LAU) procedure (e.g., based on the location area (LA) of a cell of the WCDMA RAT being a new LA). UE 145, 250, 710 may indicate to MSC 135, 750 that CSFB has occurred. In some aspects, UE 145, 250, 710 may initiate the LAU procedure when UE 145, 250, 710 is handed over to the WCDMA RAT. A period of time associated with performing the LAU procedure may satisfy (e.g., exceed) the threshold period of time associated with causing UE 145, 250, 710 to be permitted to transfer to the LTE RAT. UE 145, 250, 710 may refrain from transferring to the LTE RAT despite the period of time satisfying the threshold period of time and until completion of the connection establishment procedure (e.g., and after completing the CSFB voice call). In this way, UE 145, 250, 710 improves a likelihood that the connection establishment procedure is completed and the CSFB call is successful relative to UE 145, 250, 710 reselecting to the LTE RAT.

As further shown in FIG. 7, and by reference indicator 4*b*, UE 145, 250, 710 may transmit, to MSC 135, 750, a connection management (CM) service request to indicate that a subsequent call establishment procedure (e.g., to set up a CSFB call) is based on an MO CSFB.

As further shown in FIG. 7, and by reference indicator 5, UE 145, 250, 710 may receive, from MSC 135, 750 a rejection of the CM service request. In some aspects, UE may receive the rejection if UE 145, 250 710 is not registered on MSC 135, 750, not permitted to be connected in the location area, and/or the like. Alternatively, UE 145, 250, 710 may fail to receive the rejection of the CM service request and may perform a call establishment procedure to establish the CSFB call.

As further shown in FIG. 7, and by reference indicator 6, UE 145, 250, 710 may initiate the call establishment procedure (e.g., a CS call establishment procedure for a CSFB call) to initiate a CS voice call.

As further shown in FIG. 7, and by reference indicator 7, UE 145, 250, 710 may perform one or more functions associated with inter-RAT handover (e.g., from an E-UTRAN associated with the LTE RAT to the UTRAN/GERAN associated with the WCDMA RAT). Completion of the one or more functions may cause the connection establishment procedure to be completed, and may permit UE 145, 250, 710 to successfully place a CSFB voice call. After completion of the connection establishment procedure, UE 145, 250, 710 may permit UE 145, 250, 710 to initiate a transfer to the LTE RAT. For example, based on the CSFB voice call being terminated and/or a condition of the LTE RAT improving to permit voice calls via the LTE RAT, UE 145, 250, 710 may transfer to the LTE RAT.

Based on refraining from or avoiding (e.g., temporarily) performing a transfer to the LTE RAT during the connection establishment procedure, UE 145, 250, 710 improves a likelihood that UE 145, 250, 710 successfully places the CSFB call, thereby improving user experience relative to transferring to an LTE RAT where a voice call may fail.

As indicated above, FIG. 7 is provided as an example. Other examples are possible and may differ from what was described with respect to FIG. 7. Although the present methods and apparatus are described above with reference to a MO call, the present methods and apparatus are applicable to a mobile terminating (MT) call.

Figure 8:
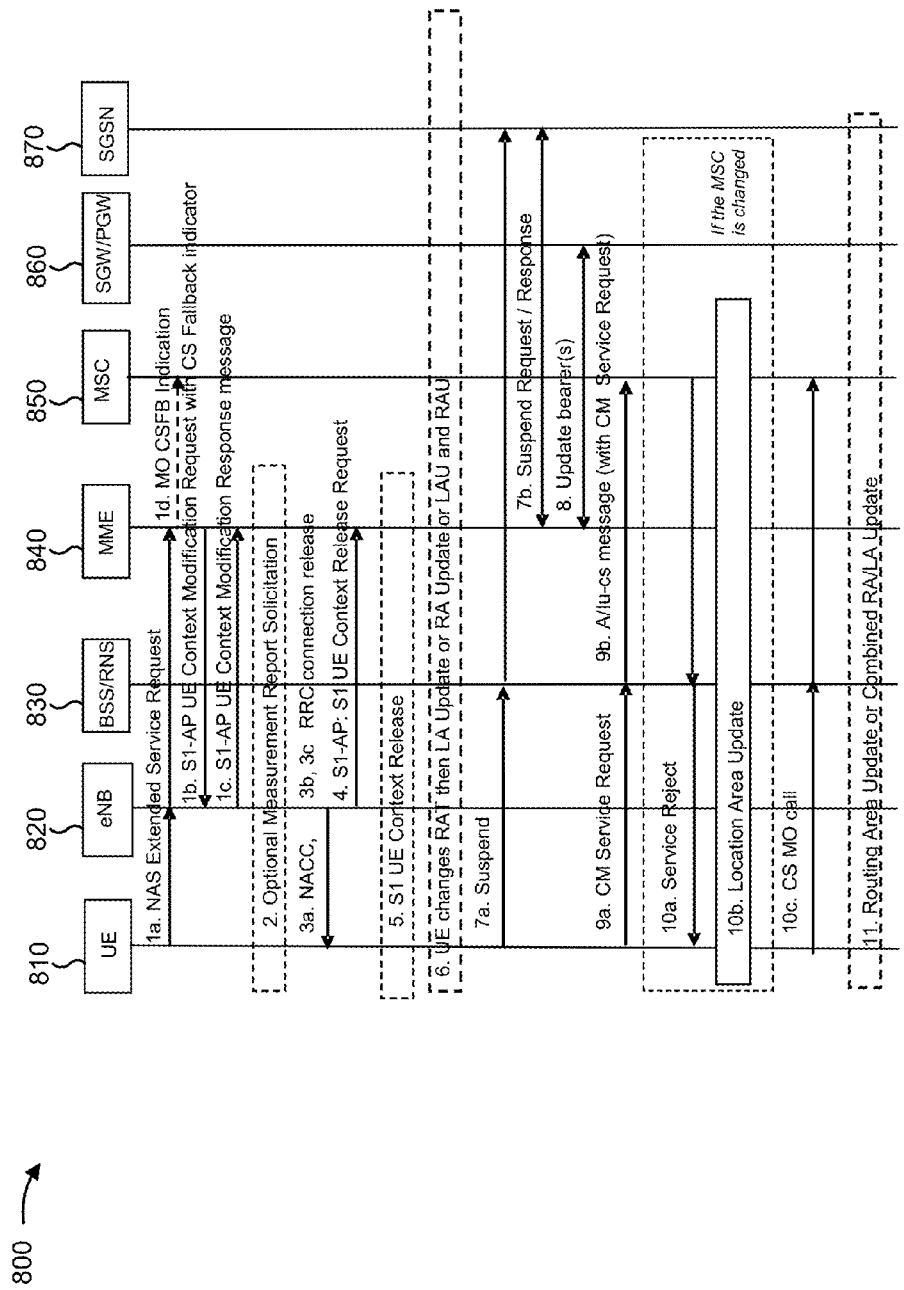
FIG. 8 is a diagram illustrating another call flow for a circuit switched fallback scenario, in accordance with various aspects of the present disclosure.

FIG. 8 is a diagram illustrating an example 800 where a wireless communication device (e.g., UE 145, 250) refrains from transferring to an LTE RAT, in accordance with various aspects of the present disclosure. For example, FIG. 8 illustrates a call flow for a connection establishment procedure when packet switched handover is not supported, in accordance with various aspects of the present disclosure.

As shown in FIG. 8, an example implementation may include a UE 810, an eNB 820, a BSS/RNS 830, an MME 840, an MSC 850, an SGW/PGW 860, and a SGSN 870.

UE 810 may correspond to UE 145 shown in FIG. 1, UE 250 shown in FIG. 2, UE 710 shown in FIG. 7, and/or the like. eNB 820 may correspond to eNB 110 or base station 130 shown in FIG. 1, eNB 210 or low power eNB 230 shown in FIG. 2, eNB 720 shown in FIG. 7, and/or the like. BSS/RNS 830 may correspond to BSS/RNS 730 shown in FIG. 7 and/or the like. MME 840 may correspond to MME 120 shown in FIG. 1, MME 740 shown in FIG. 7, and/or the like. MSC 850 may correspond to MSC 135 shown in FIG. 1, MSC 750 shown in FIG. 7, and/or the like. SGW/PGW 860 may correspond to SGW 115 shown in FIG. 1, SGW 770 or PGW/GGSN 780 shown in FIG. 7, and/or the like. SGSN 870 may correspond to SGSN 760 shown in FIG. 7 and/or the like.

As further shown in FIG. 8, and by reference indicator 1a, UE 145, 250, 710, 810 may transmit, to MME 120, 740, 840, an extended service request for an MO CSFB (e.g., via eNB 110, 130, 210, 230, 720, 820), as described herein regarding FIG. 7.

As further shown in FIG. 8, and by reference indicator 1b, MME 120, 740, 840 may transmit, to eNB 110, 130, 210, 230, 720, 820 a context modification request message with information identifying the CSFB. The context modification request may indicate to eNB 110, 130, 210, 230, 720, 820 that UE 145, 250, 710, 810 is to be transferred to a UTRAN/GERAN RAT, such as a WCDMA RAT and/or the like.

As further shown in FIG. 8, and by reference indicator 1c, eNB 110, 130, 210, 230, 720, 820 may transmit a context modification response message acknowledging the context modification request message.

As further shown in FIG. 8, and by reference indicator 1d, MME 120, 740, 840 may transmit, to MSC 135, 750, 850, an MO CSFB indicator to identify the MO CSFB.

As further shown in FIG. 8, and by reference indicator 2, UE 145, 250, 710, 810 may receive a request to provide a measurement report, and may provide the measurement report in response to the request, as described herein regarding FIG. 7.

As further shown in FIG. 8, and by reference indicator 3a, 3b, and/or 3c, eNB 110, 130, 210, 230, 720, 820 may transmit a message associated with the connection establishment procedure. For example, regarding reference indicator 3a, eNB 110, 130, 210, 230, 720, 820 may transmit a message (e.g., a network-assisted cell change (NACC) message) to UE 145, 250, 710, 810 to trigger an inter-RAT cell change order from an E-UTRAN cell (e.g., an LTE RAT) to a GERAN/UTRAN target cell (e.g., of the WCDMA RAT). Alternatively, regarding reference indicator 3b and/or 3c, eNB 110, 130, 210, 230, 720, 820 may transmit another message to trigger an RRC connection release.

As further shown in FIG. 8, and by reference indicator 4, eNB 110, 130, 210, 230, 720, 820 may transmit, to MME 120, 740, 840, a context release request message to cause MME 120, 740, 840 to release a UE context in eNB 110, 130, 210, 230, 720, 820.

As further shown in FIG. 8, and by reference indicator 5, a UE context release procedure is triggered by MME 120, 740, 840 based on receiving the context release request message.

As further shown in FIG. 8, and by reference indicator 6, UE 145, 250, 710, 810 changes RAT (e.g., from the LTE RAT to the CDMA RAT) and performs an LAU procedure, as described herein regarding FIG. 7. Additionally, or alternatively, UE 145, 250, 710, 810 may perform an RAU procedure, a combined RAU/LAU procedure, and/or the like. After changing RAT, UE 145, 250, 710 810 may set a timer associated with determining whether a threshold period of time has elapsed. After the threshold period of time has elapsed for performing the LAU procedure, the RAU procedure, or the combined RAU/LAU procedure, UE 145, 250, 710, 810 may determine that UE 145, 250, 710, 810 is permitted to reselect to the LTE RAT. UE 145, 250, 710, 810 may refrain from transferring from the WCDMA RAT to the LTE RAT despite the period of time satisfying (e.g., meeting, exceeding) the threshold period of time and until the connection establishment procedure is complete. In this way, UE 145, 250, 710, 810 may increase a likelihood of CSFB call success, which may improve a KPI associated with UE 145, 250, 710, 810 relative to the CSFB call failing.

As further shown in FIG. 8, and by reference indicators 7a and 7b, UE 145, 250, 710, 810 triggers a suspend procedure, as described herein regarding FIG. 7.

As further shown in FIG. 8, and by reference indicator 8, MME 120, 740, 840 may cause SGSN 760, 870 to suspend one or more bearers based on, for example, the context release request message, as described herein regarding FIG. 7.

As further shown in FIG. 8, and by reference indicators 9a and 9b, UE 145, 250, 710, 810 transmits a CM service request, as described herein regarding FIG. 7.

As further shown in FIG. 8, and by reference indicator 10a, UE 145, 250, 710, 810 may receive a rejection of the CM service request based on UE 145, 250, 710 failing to be registered on MSC 135, 750, 850. Additionally, or alternatively, UE 145, 250, 710, 810 may fail to receive the rejection of the CM service request, as described herein regarding FIG. 7.

As further shown in FIG. 8, and by reference indicator 10b, UE 145, 250, 710, 810 may, based on receiving the rejection of the CM service request, perform an LAU procedure and/or a combined LAU/RAU procedure as described herein.

As further shown in FIG. 8, and by reference indicator 10c, UE 145, 250, 710, 810 may initiate a CS call establishment procedure to establish a CS voice call, as described herein with regards to FIG. 7.

As further shown in FIG. 8, and by reference indicator 11, UE 145, 250, 710, 810 may perform an RAU procedure, a combined RAU/LAU procedure, and/or the like based on terminating the CS voice call. Based on performing the RAU procedure, the combined RAU/LAU procedure, and/or the like, UE 145, 250, 710, 810 may perform one or more functionalities associated with an inter-RAT handover, as described herein regarding FIG. 7. Additionally, or alternatively, UE 145, 250, 710, 810 may remain on a UTRAN/GERAN cell, such as a cell associated with the WCDMA RAT after termination of the CS voice call.

As indicated above, FIG. 8 is provided as an example. Other examples are possible and may differ from what was described with respect to FIG. 8. Although the present methods and apparatus are described above with reference to a MO call, the present methods and apparatus are applicable to a mobile terminating (MT) call.

Figure 9:
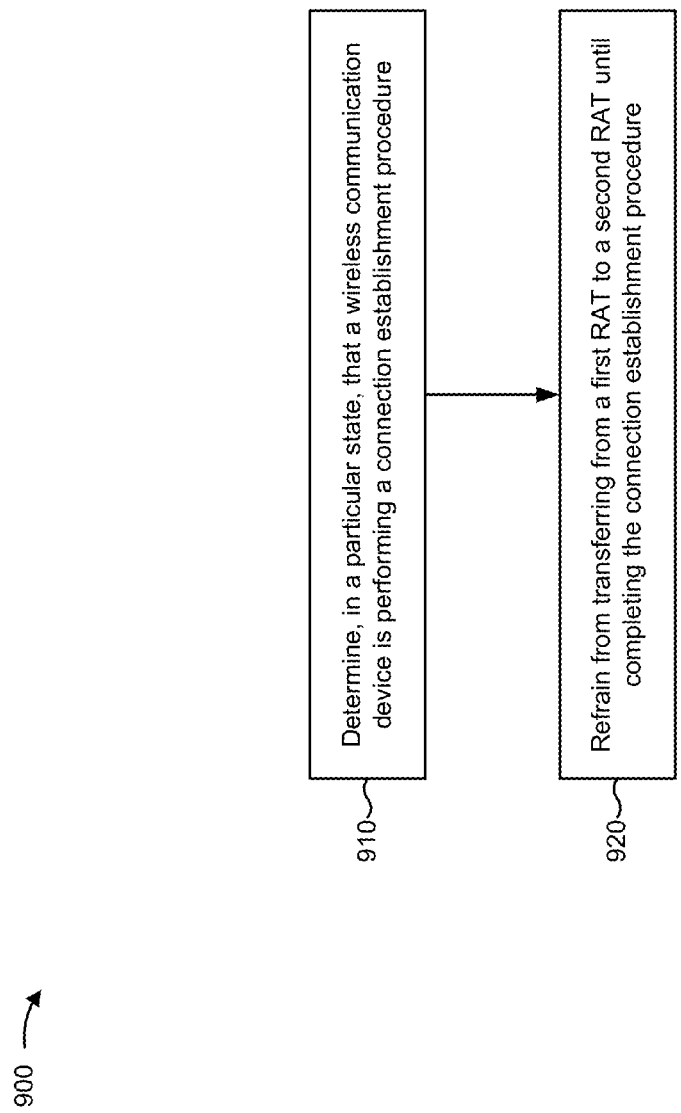
FIG. 9 is a diagram illustrating an example process performed, for example, by a wireless communication device, in accordance with various aspects of the present disclosure.

FIG. 9 is a diagram illustrating an example process 900 performed, for example, by a wireless communication device, in accordance with various aspects of the present disclosure. Example process 900 is an example where a wireless communication device (e.g., UE 145, 250, 710, 810) refrains from or avoids (e.g., temporarily) transferring to an LTE RAT.

As shown in FIG. 9, process 900 may include determining, in a particular state, that a wireless communication device is performing a connection establishment procedure (block 910). For example, a wireless communication device may determine, in the particular state, that the wireless communication device is performing a connection establishment procedure. In some aspects, the particular state may be a CELL_FACH state. Additionally, or alternatively, the particular state may be a shared channel state.

In some aspects, the wireless communication device may determine that the wireless communication device is performing a particular type of connection establishment procedure. For example, the wireless communication device may determine that the wireless communication device is performing a CSFB procedure (e.g., an MO CSFB) to permit a voice call to be performed by the wireless communication device. In some aspects, the voice call may be a CS domain call (e.g., a CS domain voice call).

In some aspects, the wireless communication device may determine that the wireless communication device is performing the connection establishment procedure based on performing an inter-RAT transfer. For example, the wireless communication device may initiate a transfer from an LTE RAT to a WCDMA RAT, and may determine that the wireless communication device is performing the connection establishment procedure to establish a connection to the WCDMA RAT. Additionally, or alternatively, the wireless communication device may initiate a transfer to another type of RAT, such as a GSM RAT, a 1×RTT RAT, a DO RAT, and/or the like.

As shown in FIG. 9, process 900 may include refraining from transferring from a first RAT to a second RAT until completing the connection establishment procedure (block 920). For example, the wireless communication device may refrain from transferring from a WCDMA RAT to an LTE RAT until completing the connection establishment procedure. In some aspects, the first RAT may include another type of RAT, such as a GSM RAT, a 1×RTT RAT, a DO RAT, and/or the like.

In some aspects, the wireless communication device may refrain from transferring to the second RAT despite a set of absolute priorities indicating that the wireless communication device is permitted to transfer to the second RAT. For example, the wireless communication device may refrain from transferring from a WCDMA RAT to an LTE RAT, despite an absolute priority associated with the LTE RAT being greater than an absolute priority associated with the WCDMA RAT.

In some aspects, the wireless communication device may refrain from transferring to the LTE RAT despite one or more of a set of reselection conditions being satisfied. For example, the wireless communication device may be permitted to transfer to the LTE RAT based on satisfying one or more of a set of cell transfer criteria (e.g., FE_FACH transfer criteria), a threshold period of time elapsing (e.g., a period of one second from when the wireless communication device starts camping on the first RAT during the connection establishment procedure), and/or the like. In this case, the wireless communication device may refrain from transferring (e.g., reselecting) to the second RAT (e.g., the LTE RAT) despite satisfying one or more of the set of cell transfer criteria, determining that the threshold period of time has elapsed, and/or the like.

Additionally, or alternatively, process 900 may include determining to change from the second RAT to the first RAT and refraining from transferring from the first RAT to the second RAT based on determining to change from the second RAT to the first RAT.

Additionally, or alternatively, the transfer may be a reselection.

Additionally, or alternatively, the connection establishment procedure may be a CSFB procedure and the transfer may be an FE_FACH triggered reselection procedure.

Additionally, or alternatively, the connection establishment procedure may be a connection establishment procedure for a CS domain call and process 900 may include refraining from transferring from the first RAT to the second RAT based on the connection establishment procedure being a connection establishment procedure for the CS domain call.

Additionally, or alternatively, process 900 may include monitoring, in the particular state, the second RAT, determining that the second RAT satisfies one or more of the set of cell transfer criteria based on monitoring the second RAT, satisfaction of one or more of the set of cell transfer criteria may be associated with permitting the transfer to the second RAT, and refraining from transferring from the first RAT to the second RAT despite determining that the second RAT satisfies one or more of the set of cell transfer criteria.

Additionally, or alternatively, process 900 may include determining that a timer associated with the connection establishment procedure is expired, the timer may be associated with permitting the transfer to the second RAT and refraining from transferring from the first RAT to the second RAT despite determining that the timer associated with the connection establishment procedure is expired. Additionally, or alternatively, the timer may be configured to count a time period of one (1) second after which the timer may expire.

Additionally, or alternatively, the first RAT may include at least one of a WCDMA RAT, a 1×RTT RAT, a DO RAT, or a GSM RAT, and/or the second RAT may include an LTE RAT.

Additionally, or alternatively, the particular state may be a CELL_FACH state.

Additionally, or alternatively, the particular state may be a shared channel state.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel, in series, and/or in some combination.

Figure 10:
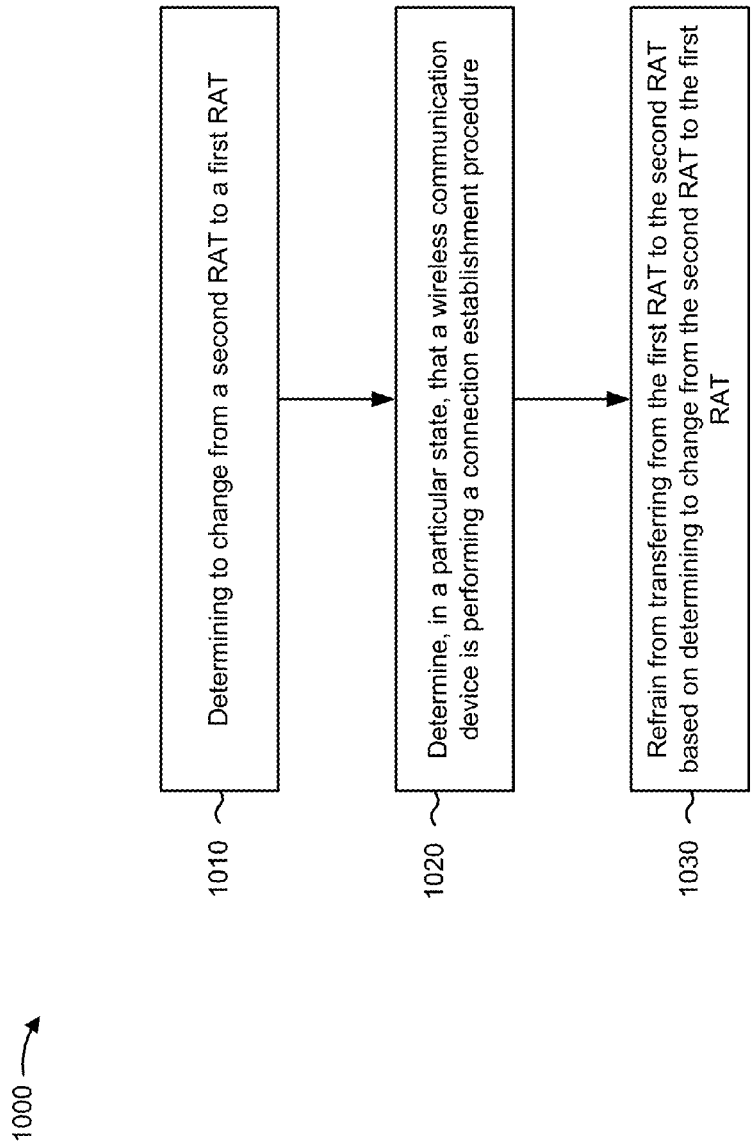
FIG. 10 is a diagram illustrating another example process performed, for example, by a wireless communication device, in accordance with various aspects of the present disclosure.

FIG. 10 is a diagram illustrating an example process 1000 performed, for example, by a wireless communication device, in accordance with various aspects of the present disclosure. Example process 1000 is an example where a wireless communication device (e.g., UE 145, 250, 710, 810) refrains from or avoids (e.g., temporarily) transferring to an LTE RAT.

As shown in FIG. 10, in some aspects, process 1000 may include determining to change from a second RAT to a first RAT (block 1010). For example, a wireless communication device may determine to change from an LTE RAT to a WCDMA RAT. In some aspects, the wireless communication device may determine to change from the second RAT to the first RAT based on being unable to place a voice call via the second RAT. For example, the wireless communication device may determine that the wireless communication device is unable to place a voice call via the LTE RAT and may determine to change to the WCDMA RAT to place the voice call.

In some aspects, the wireless communication device may initiate the change from the second RAT to the first RAT based on determining to change from the second RAT to the first RAT. For example, the wireless communication device may initiate a connection establishment procedure to connect to the WCDMA RAT to perform a voice call. In some aspects, the connection establishment procedure may be a CSFB procedure to fall back to the WCDMA RAT to place a CS domain voice call via the first RAT. Additionally, or alternatively, the wireless communication device may fall back to another type of RAT, such as a GSM RAT, a 1×RTT RAT, a DO RAT, and/or the like.

As shown in FIG. 10, in some aspects, process 1000 may include determining, in a particular state, that a wireless communication device is performing a connection establishment procedure (block 1020). For example, the wireless communication device may determine, while in the particular state (e.g., a CELL_FACH state), that the wireless communication device is performing the connection establishment procedure. In some aspects, the wireless communication device may perform the connection establishment procedure based on determining to change from the second RAT to the first RAT. In some aspects, the wireless communication device may perform the connection establishment procedure to change from the second RAT to the first RAT. For example, the wireless communication device may initiate a connection establishment procedure, may camp on the first RAT, and may attempt to perform a CSFB call via the first RAT. In this case, the wireless communication device may be triggered to transfer from the first RAT to the second RAT during the connection establishment procedure, and may refrain from transferring from the first RAT to the second RAT.

As shown in FIG. 10, in some aspects, process 1000 may include refraining from transferring from the first RAT to the second RAT based on determining to change from the second RAT to the first RAT (block 1030). For example, the wireless communication device may refrain from transferring from the WCDMA RAT to the LTE RAT based on determining to change from the LTE RAT to the WCDMA RAT. Additionally, or alternatively, the wireless communication device may refrain from transferring to the LTE RAT based on determining to change to another type of RAT, such as a GSM RAT, a 1×RTT RAT, a DO RAT, and/or the like. In some aspects, the wireless communication device may refrain from transferring from the second RAT to the first RAT until the connection establishment procedure is completed. For example, based on determining to change from the LTE RAT to the WCDMA RAT, the wireless communication device may refrain from transferring from the WCDMA RAT to the LTE RAT until the connection establishment procedure is completed.

In this way, the wireless communication device avoids interrupting the connection establishment procedure, intended to transfer the wireless communication device from the LTE RAT to the WCDMA RAT for a CSFB voice call, and reselecting to the LTE RAT. Moreover, by avoiding interrupting the connection establishment procedure to reselect to the LTE RAT, the wireless communication device increases a likelihood that the connection establishment procedure is successful and the wireless communication device is able to place a CSFB voice call relative to permitting the reselection to the LTE RAT during the connection establishment procedure.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel, in series, and/or in some combination.

Figure 11:
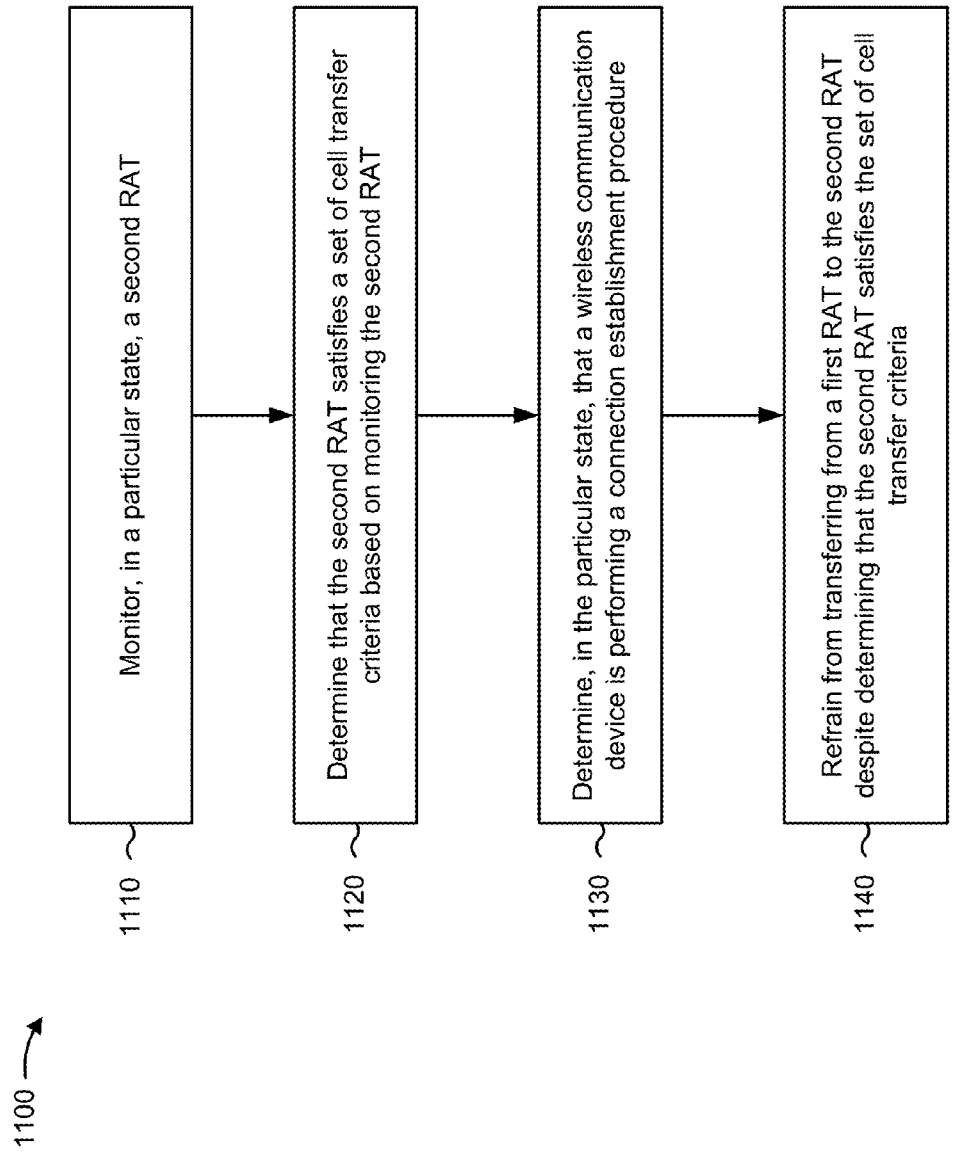
FIG. 11 is a diagram illustrating another example process performed, for example, by a wireless communication device, in accordance with various aspects of the present disclosure.

FIG. 11 is a diagram illustrating an example process 1100 performed, for example, by a wireless communication device, in accordance with various aspects of the present disclosure. Example process 1100 is an example where a wireless communication device (e.g., UE 145, 250, 710, 810) refrains from or avoids (e.g., temporarily) transferring to an LTE RAT.

As shown in FIG. 11, in some aspects, process 1100 may include monitoring, in a particular state, a second RAT (block 1110). For example, the wireless communication device may monitor, in an FE_FACH state, an LTE RAT. In some aspects, the wireless communication device may monitor a particular cell of the LTE RAT. For example, the wireless communication device may identify a target cell to which the wireless communication device is capable of transferring, and may perform one or more measurements associated with the target cell (e.g., one or more measurements associated with the FE_FACH state). In some aspects, the wireless communication device may perform a particular type of measurement associated with the target cell, such as an inter-frequency measurement, an intra-frequency measurement, a signal strength measurement, a cell quality measurement, and/or the like.

In some aspects, the wireless communication device may monitor the second RAT based on being in the particular state. For example, based on determining that the wireless communication device is in an FE_FACH state, such as during performance of an LAU procedure, an RAU procedure, a combined LAU/RAU procedure, and/or the like, the wireless communication device may monitor the LTE RAT to determine whether the LTE RAT is a suitable RAT to which to transfer.

As shown in FIG. 11, in some aspects, process 1100 may include determining that the second RAT satisfies one or more of a set of cell transfer criteria based on monitoring the second RAT (block 1120). For example, the wireless communication device may determine that the target cell of the LTE RAT satisfies one or more of the set of cell transfer criteria associated with initiating a transfer to the LTE RAT. In some aspects, the set of cell transfer criteria may include a set of FE_FACH transfer criteria. For example, the wireless communication device may determine, in a CELL_FACH state and based on monitoring the LTE RAT, that one or more of the set of transfer criteria associated with performing a transfer to the LTE RAT is/are satisfied. In this case, the wireless communication device may determine that the wireless communication device is permitted to transfer to the LTE RAT.

As shown in FIG. 11, in some aspects, process 1100 may include determining, in the particular state, that a wireless communication device is performing a connection establishment procedure (block 1130). For example, the wireless communication device may determine, in the CELL_FACH state, that the wireless communication device is performing the connection establishment procedure (e.g., to cause the wireless communication device to change from the LTE RAT to a WCDMA RAT to perform a CSFB call).

In some aspects, the wireless communication device may determine that the wireless communication device is performing the connection establishment procedure based on determining that the second RAT (e.g., the LTE RAT) satisfies one or more of the set of cell transfer criteria. For example, based on determining that one or more of the set of cell transfer criteria is/are satisfied and that the wireless communication device is permitted to transfer to the LTE RAT, the wireless communication device may determine whether the wireless communication device is performing the connection establishment procedure to establish a connection to the WCDMA RAT. In this way, the wireless communication device determines whether transferring to the LTE RAT is a reselection to the LTE RAT that interrupts an attempt to fall back to the WCDMA network to place the CSFB call.

As shown in FIG. 11, in some aspects, process 1100 may include refraining from transferring from a first RAT to the second RAT despite determining that the second RAT satisfies one or more of the set of cell transfer criteria (block 1140). For example, the wireless communication device may refrain from transferring from the CDMA RAT to the LTE RAT despite determining that the LTE RAT satisfies one or more of the set of FE_FACH transfer criteria. In some aspects, the wireless communication device may refrain from transferring from the CDMA RAT to the LTE RAT despite determining that the LTE RAT satisfies one or more of the set of cell transfer criteria and/or until the connection establishment procedure is completed. In this way, the wireless communication device avoids interrupting the connection establishment procedure to transfer to the LTE network, despite being permitted to transfer to the LTE network, thereby improving a likelihood that the wireless communication device is successful in placing a CSFB call relative to permitting the connection establishment procedure to be interrupted.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel, in series, and/or in some combination.

Figure 12:
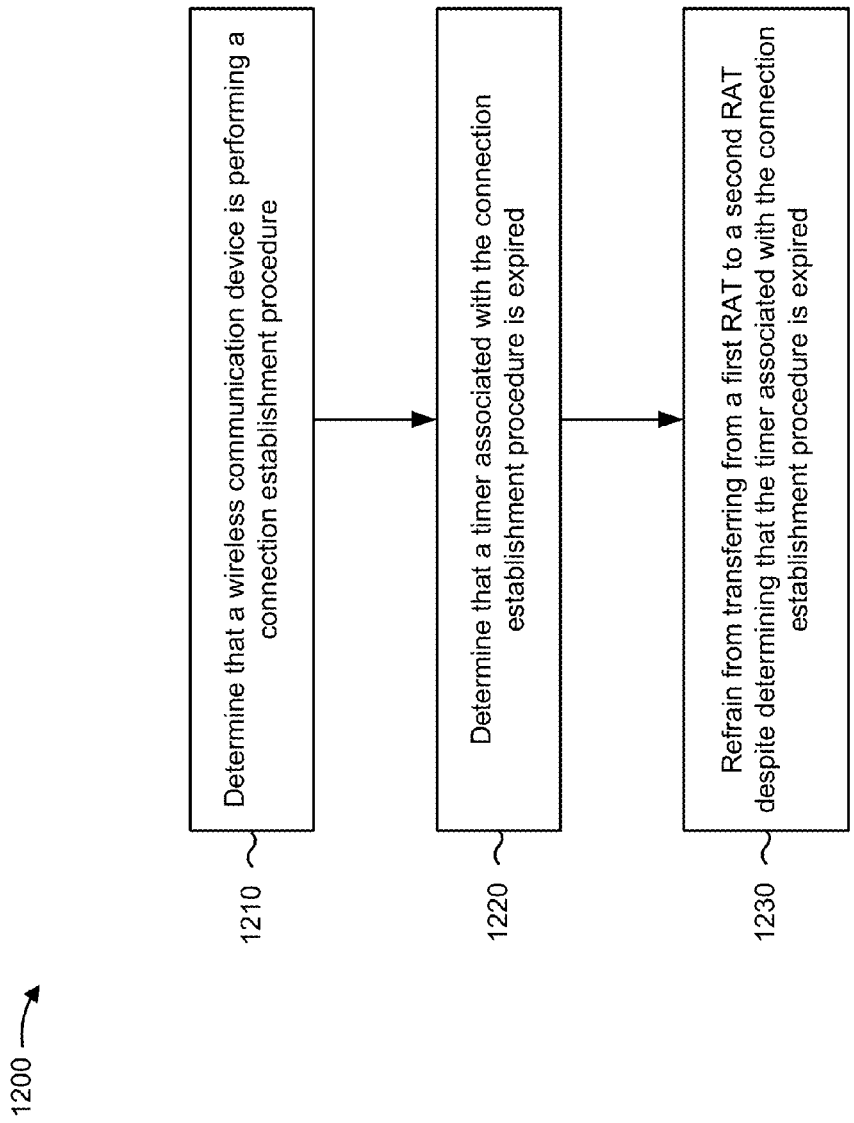
FIG. 12 is a diagram illustrating another example process performed, for example, by a wireless communication device, in accordance with various aspects of the present disclosure.

FIG. 12 is a diagram illustrating an example process 1200 performed, for example, by a wireless communication device, in accordance with various aspects of the present disclosure. Example process 1200 is an example where a wireless communication device (e.g., UE 145, 250, 710, 810) refrains from or avoids (e.g., temporarily) transferring to an LTE RAT.

As shown in FIG. 12, in some aspects, process 1200 may include determining that a wireless communication device is performing a connection establishment procedure (block 1210). For example, the wireless communication device may determine that the wireless communication device is performing the connection establishment procedure. In some aspects, the wireless communication device may trigger a timer concurrent with performing the connection establishment procedure. For example, based on camping on a cell of a WCDMA RAT to which the wireless communication device is to connect, the wireless communication device may trigger a timer associated with the connection establishment procedure. Additionally, or alternatively, the wireless communication device may trigger the timer based on camping on a cell of another type of RAT, such as a GSM RAT, a 1xRTT RAT, a DO RAT, and/or the like.

In some aspects, the timer may be associated with a threshold period of time. For example, the wireless communication device may trigger the timer to determine whether the threshold period of time, during which to perform the connection establishment procedure and after which the wireless communication device may be permitted to transfer to another RAT (e.g., an LTE RAT), has elapsed. In some aspects, the threshold period of time may be one second. In some aspects, the threshold period of time may be less than one second.

As shown in FIG. 12, in some aspects, process 1200 may include determining that a timer associated with the connection establishment procedure is expired (block 1220). For example, the wireless communication device may determine that the timer associated with the connection establishment procedure is expired. In some aspects, the wireless communication device may determine that the timer is expired after a threshold period of time has elapsed from setting the timer. For example, the wireless communication device may determine that the timer is expired one second after camping on a cell of the WCDMA RAT to fall back to the WCDMA RAT to place a CSFB call. In some aspects, the wireless communication device may determine that the timer is expired after a portion of the connection establishment procedure exceeds the threshold period of time, such as a portion of the connection establishment procedure associated with performing an LAU procedure, an RAU procedure, a combined LAU/RAU procedure, and/or the like.

As shown in FIG. 12, in some aspects, process 1200 may include refraining from transferring from a first RAT to a second RAT despite determining that the timer associated with the connection establishment procedure is expired (block 1230). For example, the wireless communication device may refrain from transferring from a CDMA RAT to an LTE RAT despite determining that the timer associated with the connection establishment procedure is expired.

In some aspects, the wireless communication device may refrain from transferring to the LTE RAT until after the connection establishment procedure is completed. For example, based on transferring from the LTE RAT to the CDMA RAT for a CSFB call and despite the timer associated with the connection establishment procedure expiring, the wireless communication device may refrain from reselecting to the LTE RAT until after the connection establishment procedure is completed. In this way, the wireless communication device avoids interrupting the connection establishment procedure when the timer expires, thereby improving a likelihood that the wireless communication device successfully places the CSFB call via the WCDMA RAT.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel, in series, and/or in some combination.

Techniques and apparatuses described herein may cause a wireless communication device to refrain from or avoid (e.g., temporarily) transferring from a first RAT (e.g., a WCDMA RAT) to a second RAT (e.g., an LTE RAT) during a connection establishment procedure intended to establish a connection to the first RAT to place a CSFB call. This may improve a likelihood that the wireless communication device is successful at placing the CSFB call relative to permitting the wireless communication device to interrupt the connection establishment procedure, which may improve a KPI associated with the wireless communication device. Moreover, this may reduce signaling messages based on avoiding a scenario where the wireless communication device repeatedly attempts to fall back to the first RAT, but instead reselects to the second RAT during a CSFB procedure.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based at least in part on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. For example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based at least in part on" unless explicitly stated otherwise.

What is claimed is:

1. A method for wireless communications, comprising:
   determining, by a wireless communication device in a particular state, that the wireless communication device is performing a connection establishment procedure;
   determining, before completion of the connection establishment procedure, that a second radio access technology (RAT) satisfies a set of transfer criteria associated with performing a transfer from a first RAT to the second RAT; and
   refraining, by the wireless communication device, from transferring from the first RAT to the second RAT until completing the connection establishment procedure despite determining that the second RAT satisfies the set of transfer criteria.

2. The method of claim 1, further comprising:
   determining to change from the second RAT to the first RAT; and
   refraining from transferring from the first RAT to the second RAT based on determining to change from the second RAT to the first RAT.

3. The method of claim 1, wherein the transfer is a reselection.

4. The method of claim 1, wherein the connection establishment procedure is a circuit-switched fallback (CSFB) procedure and the transfer is a further enhanced forward access channel (FE_FACH) triggered reselection procedure.

5. The method of claim 1, wherein the connection establishment procedure is a connection establishment procedure for a circuit switched (CS) domain call; and
   the method further comprising:
   refraining from transferring from the first RAT to the second RAT based on the connection establishment procedure being the connection establishment procedure for the CS domain call.

6. The method of claim 1, further comprising:
   determining that a timer associated with the connection establishment procedure is expired,
   the timer being associated with permitting the transfer to the second RAT, wherein the timer is at least part of the set of transfer criteria; and
   refraining from transferring from the first RAT to the second RAT despite determining that the timer associated with the connection establishment procedure is expired.

7. The method of claim 6, wherein the timer is configured to count a time period of 1 second after which the timer expires.

8. The method of claim 1, wherein the first RAT comprises:
   at least one of a wideband code division multiple access (WCDMA) RAT, a single-carrier radio transmission technology (1×RTT) RAT, a data optimized (DO) RAT, or a global system for mobile communications (GSM) RAT; and
   wherein the second RAT comprises:
   a long term evolution (LTE) RAT.

9. The method of claim 1, wherein the particular state is a cell forward access channel (CELL_FACH) state.

10. The method of claim 1, wherein the particular state is a shared channel state.

11. A wireless communication device, comprising:
    one or more processors configured to:
    determine, by a wireless communication device in a particular state, that the wireless communication device is performing a connection establishment procedure;
    determine, before completion of the connection establishment procedure, that a second radio access technology (RAT) satisfies a set of transfer criteria associated with performing a transfer from a first RAT to the second RAT; and
    refrain, by the wireless communication device, from transferring from the first RAT to the second RAT until completing the connection establishment procedure despite determining that the second RAT satisfies the set of transfer criteria.

12. The wireless communication device of claim 11, wherein the one or more processors are further configured to:
    determine to change from the second RAT to the first RAT; and refrain from transferring from the first RAT to the second RAT based on determining to change from the second RAT to the first RAT.

13. The wireless communication device of claim 11, wherein the transfer is a reselection.

14. The wireless communication device of claim 11, wherein the connection establishment procedure is a circuit-switched fallback (CSFB) procedure and the transfer is a further enhanced forward access channel (FE_FACH) triggered reselection procedure.

15. The wireless communication device of claim 11, wherein the connection establishment procedure is a connection establishment procedure for a circuit switched (CS) domain call; and
wherein the one or more processors are further configured to:
refrain from transferring from the first RAT to the second RAT based on the connection establishment procedure being the connection establishment procedure for the CS domain call.

16. The wireless communication device of claim 11, wherein the one or more processors are further configured to:
determine that a timer associated with the connection establishment procedure is expired,
the timer being associated with permitting the transfer to the second RAT, wherein the timer is at least part of the set of transfer criteria; and
refrain from transferring from the first RAT to the second RAT despite determining that the timer associated with the connection establishment procedure is expired.

17. The wireless communication device of claim 16, wherein the timer is configured to count a time period of 1 second after which the timer expires.

18. The wireless communication device of claim 11, wherein the first RAT comprises:
at least one of a wideband code division multiple access (WCDMA) RAT, a single-carrier radio transmission technology (1×RTT) RAT, a data optimized (DO) RAT, or a global system for mobile communications (GSM) RAT; and
wherein the second RAT comprises:
a long term evolution (LTE) RAT.

19. The wireless communication device of claim 11, wherein the particular state is a cell forward access channel (CELL_FACH) state.

20. The wireless communication device of claim 11, wherein the particular state is a shared channel state.

21. A non-transitory computer-readable medium storing one or more instructions for wireless communication, the one or more instructions comprising:
one or more instructions that, when executed by one or more processors, cause the one or more processors to:
determine, by a wireless communication device in a particular state, that the wireless communication device is performing a connection establishment procedure;
determine, before completion of the connection establishment procedure, that a second radio access technology (RAT) satisfies a set of transfer criteria associated with performing a transfer from a first RAT to the second RAT; and
refrain, by the wireless communication device, from transferring from the first RAT to the second RAT until completing the connection establishment procedure despite determining that the second RAT satisfies the set of transfer criteria.

22. The non-transitory computer-readable medium of claim 21, wherein the connection establishment procedure is a circuit-switched fallback (CSFB) procedure and the transfer is a further enhanced forward access channel (FE_FACH) triggered reselection procedure.

23. The non-transitory computer-readable medium of claim 21, wherein the connection establishment procedure is a connection establishment procedure for a circuit switched (CS) domain call; and
wherein the one or more instructions, when executed by the one or more processors, further cause the one or more processors to:
refrain from transferring from the first RAT to the second RAT based on the connection establishment procedure being the connection establishment procedure for the CS domain call.

24. The non-transitory computer-readable medium of claim 21, wherein the one or more instructions, when executed by the one or more processors, further cause the one or more processors to:
determine that a timer associated with the connection establishment procedure is expired,
the timer being associated with permitting the transfer to the second RAT, wherein the timer is at least part of the set of transfer criteria; and
refrain from transferring from the first RAT to the second RAT despite determining that the timer associated with the connection establishment procedure is expired.

25. An apparatus for wireless communication, comprising:
means for determining, by a wireless communication device in a particular state, that the wireless communication device is performing a connection establishment procedure;
means for determining, before completion of the connection establishment procedure, that a second radio access technology (RAT) satisfies a set of transfer criteria associated with performing a transfer from a first RAT to the second RAT; and
means for refraining, by the wireless communication device, from transferring from the first RAT to the second RAT until completing the connection establishment procedure despite determining that the second RAT satisfies the set of transfer criteria.

26. The apparatus of claim 25, wherein the connection establishment procedure is a circuit-switched fallback (CSFB) procedure and the transfer is a further enhanced forward access channel (FE_FACH) triggered reselection procedure.

27. The apparatus of claim 25, wherein the connection establishment procedure is a connection establishment procedure for a circuit switched (CS) domain call; and
the apparatus further comprising:
means for refraining from transferring from the first RAT to the second RAT based on the connection establishment procedure being the connection establishment procedure for the CS domain call.

28. The apparatus of claim 25, further comprising:
means for determining that a timer associated with the connection establishment procedure is expired,
the timer being associated with permitting the transfer to the second RAT, wherein the timer is at least part of the set of transfer criteria; and
means for refraining from transferring from the first RAT to the second RAT despite determining that the timer associated with the connection establishment procedure is expired.

* * * * *